United States Patent
Lake, Jr. et al.

(10) Patent No.: US 7,078,450 B2
(45) Date of Patent: *Jul. 18, 2006

(54) CONCENTRATES OF SATURATED BICYCLIC DICARBOXYLATE SALTS TO FACILITATE USE THEREOF AS POLYMER NUCLEATION ADDITIVES

(75) Inventors: Kemper David Lake, Jr., Spartanburg, SC (US); Bhavesh Chandrakant Gandhi, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 80 days.

This patent is subject to a terminal disclaimer.

(21) Appl. No.: 10/703,855

(22) Filed: Nov. 7, 2003

(65) Prior Publication Data

US 2005/0101713 A1 May 12, 2005

(51) Int. Cl.
*C08K 5/98* (2006.01)
*C08K 3/26* (2006.01)
*C08K 3/34* (2006.01)

(52) U.S. Cl. .............. 524/285; 524/321; 524/425; 524/451; 524/492; 524/394; 524/210; 524/582; 524/583; 524/584

(58) Field of Classification Search ........... 524/285, 524/321, 425, 582, 583, 584
See application file for complete search history.

(56) References Cited

U.S. PATENT DOCUMENTS

| | | | |
|---|---|---|---|
| 6,465,551 B1 * | 10/2002 | Zhao et al. | 524/284 |
| 6,534,574 B1 | 3/2003 | Zhao et al. | 524/284 |
| 6,936,650 B1 | 8/2005 | Mannion et al. | 524/285 |

FOREIGN PATENT DOCUMENTS

WO 98/29494 7/1998

* cited by examiner

*Primary Examiner*—Ling-Sui Choi
*Assistant Examiner*—Rip A. Lee
(74) *Attorney, Agent, or Firm*—Terry T. Moyer; John E. Vick, Jr.

(57) ABSTRACT

Concentrates (also known as masterbatches) of certain bicyclic dicarboxylate salt thermoplastic nucleating additives in order to facilitate use thereof in typical thermoplastic manufacturing procedures are provided. Such nucleating additives have been found to impart high peak crystallization temperatures to thermoplastics (such as polypropylene, as one example); however, when combined in masterbatch form in the past such a nucleation property was sacrificed due to unforeseen problems associated with polymer-containing concentrates (i.e., pellets, for example) of such additives. Thus, improvements in masterbatching of these bicyclic dicarboxylate salt thermoplastic nucleators has been accomplished to the level necessary to allow for concentrate use with concomitant effective nucleation effects at the same level (if not in excess thereof) of the utilization of such a nucleator added in powder form. Thermoplastic additive compositions and methods of producing thermoplastics with such nucleator additive concentrates are also contemplated within this invention.

44 Claims, No Drawings

CONCENTRATES OF SATURATED BICYCLIC DICARBOXYLATE SALTS TO FACILITATE USE THEREOF AS POLYMER NUCLEATION ADDITIVES

FIELD OF THE INVENTION

This invention relates to providing concentrates (also known as masterbatches) of certain bicyclic dicarboxylate salt thermoplastic nucleating additives in order to facilitate use thereof in typical thermoplastic manufacturing procedures. Such nucleating additives have been found to impart high peak crystallization temperatures to thermoplastics (such as polypropylene, as one example); however, when combined in masterbatch form in the past such a nucleation property was sacrificed to a certain extent due to unforeseen problems associated with polymer-containing concentrates (i.e., pellets, for example) of such additives. Thus, improvements in masterbatching of these bicyclic dicarboxylate salt thermoplastic nucleators have been accomplished to the level necessary to allow for concentrate use with concomitant effective nucleation effects at the same level (if not in excess thereof) of the utilization of such a nucleator added directly into a molten resin (i.e., not in concentrate form). Thermoplastic additive compositions and methods of producing thermoplastics with such nucleator additive concentrates are also contemplated within this invention.

BACKGROUND OF THE PRIOR ART

All U.S. patents cited below are herein entirely incorporated by reference.

As used herein, the term "thermoplastic" is intended to mean a polymeric material that will melt upon exposure to sufficient heat but will retain its solidified state, but not prior shape without use of a mold or like article, upon sufficient cooling. Specifically, as well, such a term is intended solely to encompass polymers meeting such a broad definition that also exhibit either crystalline or semi-crystalline morphology upon cooling after melt-formation through the use of the aforementioned mold or like article. Particular types of polymers contemplated within such a definition include, without limitation, polyolefins (such as polyethylene, polypropylene, polybutylene, and any combination thereof), polyamides (such as nylon), polyurethanes, polyester (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformity in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than un-nucleated polyolefin. Such crystallization at higher temperatures results in reduced fabrication cycle times and a variety of improvements in physical properties, such as, as one example, stiffness.

Such compounds and compositions that provide faster and or higher polymer crystallization temperatures are thus popularly known as nucleators. Such compounds are, as their name suggests, utilized to provide nucleation sites for crystal growth during cooling of a thermoplastic molten formulation. Generally, the presence of such nucleation sites results in a larger number of smaller crystals. As a result of the smaller crystals formed therein, clarification of the target thermoplastic may also be achieved, although excellent clarity is not always a result. The smaller crystal size, the less light is scattered. In such a manner, the clarity of the thermoplastic article itself can be improved. Thus, thermoplastic nucleator compounds are very important to the thermoplastic industry in order to provide enhanced clarity, physical properties and/or faster processing.

The most effective thermoplastic nucleator in terms of high crystallization temperatures is a saturated bicyclic dicarboxylate salt available from Milliken & Company under the tradename of HPN-68, disclosed within U.S. Pat. Nos. 6,465,551 and 6,534,574, both entirely incorporated herein by reference, along with other like saturated dicarboxylate salt nucleator compounds (HPN-68 itself is disodium bicyclo[2.2.1]heptanedicarboxylate). Other measurable physical improvements such compound types impart to thermoplastics include greater stiffness and superior dimensional stability. Thus, at least in standard additive introduction processes for thermoplastic production, the utilization of saturated bicyclic dicarboxylate salt nucleators can ultimately result in improved part quality and/or faster production cycle times as compared with other nucleators.

Other thermoplastic nucleating agents that exhibit appreciably lower crystallization temperatures, as well as less effective dimensional stability levels, etc., as compared with saturated dicarboxylate salt types, include dibenzylidene sorbitol compounds, such as 1,3-O-2,4-bis(3,4-dimethylbenzylidene) sorbitol (hereinafter DMDBS), available from Milliken & Company under the trade name Millad® 3988, sodium benzoate, sodium 2,2'-methylene-bis-(4,6-di-tert-butylphenyl) phosphate (from Asahi Denka Kogyo K.K., known as NA-11), talc, cyclic bis-phenol phosphates (such as NA-21, also available from Asahi Denka), and, as taught within Patent Cooperation Treaty Application WO 98/29494, to Minnesota Mining and Manufacturing, the unsaturated compound of disodium bicyclo[2.2.1]heptene dicarboxylate. Such compounds all impart relatively high polyolefin crystallization temperatures; however, each also exhibits its own drawback for large-scale industrial applications, and none can match the effectiveness of the above-noted saturated types.

Some of the above-noted nucleating agents also provide clarifying properties within certain thermoplastics, such as polypropylene (Millad® 3988, for example, and to a lesser extent, NA-21). Such clarification capabilities coupled with high peak crystallization temperatures are highly desired. The previously listed dicarboxylate salt nucleating agents unfortunately generally exhibit relatively high haze levels within polypropylene, although such compounds also provide excellent calcium stearate compatibility and increased stiffness within target thermoplastic articles. Thus, such compounds provide extremely desirable qualities and benefits within target thermoplastics. Unfortunately, as noted above, in certain applications haze issues have limited the usefulness of saturated bicyclic dicarboxylate nucleating agents, even though the crystallization temperatures imparted thereby are extremely high.

Also limiting the widespread utilization of such bicyclic dicarboxylate salt nucleators is the lack of providing proper concentrates (i.e., masterbatches) of such additives within thermoplastic production methods. Concentrates of thermoplastic additives are highly desirable for a number of reasons. Generally, the primary purpose for these concentrates has been to provide the end-use manufacturer with the flexibility to impart a wide variety of desirable properties to both general and specific purpose plastic polymers. Such concentrates contain any number of different types of additives, such as, as merely examples, organic and inorganic colorants, inorganic fillers, antioxidants, lubricants, acid scavengers, etc., and have been utilized for many years within the plastics industry. Thus, such concentrates provide a highly effective delivery system of additives in order to impart any number of different properties to the subject, ultimate thermoplastic formulation and/or article. These imparted properties may include lubricity, protection from oxidation, protection from UV degradation, protection from corrosion, antimicrobial protection, clarity, opacity, nucleation, antiblocking performance, antistatic performance, flame retardancy, viscosity change, organoleptic enhancements, impact improvement, increased stiffness, improved dimensional stability, color, and enhancements to other optical, physical, and Theological properties. Unless a plastic polymer producer or a custom compounder has the economic justification to provide a pre-compounded polymer system having the desired properties requested by a particular end-use manufacturer, then the use of concentrates is required by the end-use manufacturer to meet market demands as these manufacturers (i.e. injection molders, compression molders, extruders of film, sheet, pipe, etc., thermoformers, blow molders, rotational molders, etc.) do not typically have the means or economic incentive to produce customized resins for their own consumption. As a result, concentrates that are both efficient and cost-effective provide the greatest value to the thermoplastic end-use manufacturer.

Unfortunately, to date, effective concentrates of saturated bicyclic dicarboxylate salt nucleating additives have not been forthcoming. Past methods of introduction within thermoplastic manufacturing procedures have basically been limited to utilization of the powder or granule form of such nucleators directly within a thermoplastic formulation and/or stream prior to melt-compounding, extrusion, molding, etc., and thus added in an amount that is at-level with the amount present within the finished article (such as, without limitation, 1500 ppm), and subsequent cooling. As alluded to above, the utilization of powders complicates manufacturing methods and makes transport and introduction relatively difficult for the user. Thus, concentrates (materials when primarily comprised of carrier polymer and relatively high amounts of a nucleator that, when admixed and melt-blended with target polymer resins, permit subsequent let-down of a relatively low amount of the desired concentrate within such a target resin or finished article thereof)(a/k/a/, masterbatches)(such terms are well understood by the ordinarily skilled artisan within such the thermoplastics industry) are highly regarded for dispensing and storage. Again, however, such masterbatches or concentrates have been difficult to provide for these highly desired nucleating additives to date. The mere incorporation of such concentrated nucleators within pellets of polypropylene (or other like polymer) has not translated into effective high peak crystallization temperatures within the ultimate end-use article. Hence, there is a need to develop proper concentrate formulations in order to permit proper utilization of such bicyclic dicarboxylate salt nucleators without sacrificing the benefits such additives impart to subject thermoplastics. Unfortunately, there have been no concentrates available that have provided an economically attractive route to obtain optimum nucleation performance, along with the associated improvements of stiffness and dimensional stability, as well as potentially better clarity. This invention is thus directed to such an achievement.

OBJECTS AND DETAILED DESCRIPTION OF THE INVENTION

This invention allows an HPN-68 concentrate to be made with at least a 5% concentration of HPN-68 using a wider variety of carrier resins (along with a wide variety of available melt flow properties). The subject concentrate is more economically attractive to use as its required usage levels will be lower than the concentrates made with HPN-68 loadings containing less than 5% HPN-68. Furthermore, this concentrate, after let-down, can provide optimum nucleation properties and associated attributes that rival those of a nucleated control (dry blended and melt compounded) containing the same at-level final product loadings of HPN-68. The term "at-level" is intended to encompass the amount of nucleator present within a an article produced from a target nucleated resin wherein the nucleator was added directly to the target resin (either prior to or during melt-compounding). Thus, within a concentrate, the amount of nucleator may be as high as 20% of that material and still result in a let-down within the target nucleated resin that provides the usual amount of nucleator required to effectuate proper nucleation if added directly (i.e., from about 1000 to about 1500 ppm, an at-level amount). Finally, the shrinkage imparted by the HPN-68 may be slightly less and/or more uniform when it is delivered via the inventive concentrate compound as compared to its addition at the final target concentration via compounding a traditional ready-to-use polymer.

Therefore, an object of the invention is to provide a masterbatch [concentrate of a carrier polymer and target nucleation (a/k/a polymer morphology modifying) additives] of saturated bicyclic dicarboxylate salt nucleating agents that imparts peak crystallization temperatures of at least the same level as the neat powder form of the same nucleation agents that have been melt-compounded into the same target thermoplastic formulation. Also, an object of this invention is to provide a manner of introducing saturated bicyclic dicarboxylate salt nucleating agents in concentrate form that permits impartation of exceptional nucleation efficacy, as indicated by very high polymer peak crystallization temperatures, within polyolefin articles. Additionally, it is an object of this invention to provide thermoplastic nucleating compositions that may be used in various polyolefin media for use in myriad end-uses.

Accordingly, this invention encompasses a thermoplastic additive concentrate comprising at least one polymer constituent, at least one dispersing aid additive, and at least one saturated metal or organic salts of bicyclic dicarboxylates, preferably saturated metal or organic salts of bicyclic dicarboxylates, preferably, bicyclo[2.2.1]heptane-dicarboxylates, or, generally, compounds conforming to Formula (I)

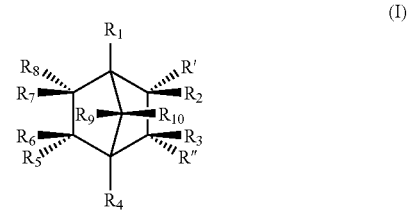

wherein $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to nine carbon atoms, R' and R" are the same or different and are individually selected from the group consisting of hydrogen, $C_1$–$C_{30}$ alkyl, hydroxy, amine, polyamine, polyoxyamine, $C_1$–$C_{30}$ alkylamine, phenyl, halogen, $C_1$–$C_{30}$ alkoxy, $C_1$–$C_{30}$ polyoxyalkyl, C(O)—$NR_{11}$C(O)O—R''', and C(O)O—R''', wherein $R_{11}$ is selected from the group consisting of $C_1C_{30}$ alkyl, hydrogen, $C_1$–$C_{30}$ alkoxy, and $C_1$–$C_{30}$ polyoxyalkyl, and wherein R''' is selected from the group consisting of hydrogen, a metal ion (such as, without limitation, $Na^+$, $K^+$, $Li^+$, $Ag^+$ and any other monovalent ions), an organic cation (such as ammonium as one non-limiting example), polyoxy-$C_2$–$C_{18}$-alkylene, $C_1$–$C_{30}$ alkyl, $C_1$–$C_{30}$ alkylene, $C_1$–$C_{30}$ alkyleneoxy, a steroid moiety (for example, cholesterol), phenyl, polyphenyl, $C_1$–$C_{30}$ alkylhalide, and $C_1$–$C_{30}$ alkylamine; wherein at least one of R' and R" is either C(O)—$NR_{11}$C(O)O—R''' or C(O)O—R''', wherein if both R' and R" are C(O)O—R''' then R''' both R' and R" may be combined into a single bivalent metal ion (such as $Ca^{2+}$, as one non-limiting example) or a single trivalent metal overbase (such as Al—OH, for one non-limiting example), wherein the amount of said saturated bicyclic dicarboxylate salt nucleating agent within said pelletized concentrate is at most 20% (preferably from about 2–10%) by total weight of the concentrate. Preferably, R' and R" are the same and R''' is either Na+ or combined together for both R' and R" and $Ca^{2+}$. Other possible compounds are discussed in the preferred embodiment section below. Also encompassed within this invention is a method of producing a thermoplastic article comprising the steps of (a) providing a thermoplastic polymer;
(b) providing a concentrate as defined above;
(c) incorporating said concentrate within said thermoplastic polymer formulation when both of said thermoplastic polymer formulation and concentrate are in molten form, thereby permitting said concentrate to melt and be mixed within said thermoplastic polymer; and
(d) allowing the resultant concentrate-containing thermoplastic polymer to cool.

Preferably, as noted above, such a nucleating compound within said concentrate, and ultimately within said nucleated thermoplastic polymer conforms to the structure of Formula (II)

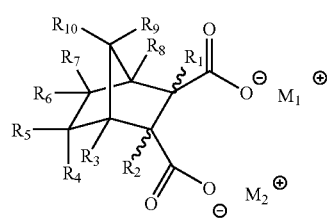

wherein $M_1$ and $M_2$ are the same or different and are independently selected from the group consisting of metal or organic cations or the two metal ions are unified into a single metal ion (bivalent, for instance, such as calcium, for example), and $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, and $C_1$–$C_9$ alkylamine, halogen, phenyl, alkylphenyl, and geminal or vicinal carbocyclic having up to 9 carbon atoms. Preferably, the metal cations are selected from the group consisting of calcium, strontium, barium, magnesium, aluminum, silver, sodium, lithium, rubidium, potassium, and the like. Within that scope, group I and group II metal ions are generally preferred. Among the group I and II cations, sodium, potassium, calcium and strontium are preferred, wherein sodium and calcium are most preferred. Furthermore, the $M_1$ and $M_2$ groups may also be combined to form a single metal cation (such as calcium, strontium, barium, magnesium, aluminum, including monobasic aluminum, and the like). Although this invention encompasses all stereochemical configurations of such compounds, the cis configuration is preferred wherein cis-endo is the most preferred embodiment. The preferred embodiment polyolefin articles and additive compositions for polyolefin formulations comprising at least one of such compounds, broadly stated as saturated bicyclic carboxylate salts, are also encompassed within this invention.

To achieve the aforementioned excellent performance improvements with saturated bicyclic dicarboxylate salt nucleators (i.e., HPN-68), good distribution and dispersion of the nucleator is required. Thus, as noted above, a dispersion aid additive is required to provide such results and thus ultimately permit production of high peak crystallization temperature thermoplastics through utilization of the inventive concentrates. The term "dispersion aid additive" in relation to this invention is intended to encompass any compound that, when incorporated in an amount of from about 1–80% (preferably from about 2–75%, more preferably from about 5–65%, and most preferably from about 25–60%) by weight of the total pelletized concentrate, permits proper dispersion of the nucleating agent, above, in order to permit the proper impartation of the desired high peak crystallization temperatures within the target ultimate thermoplastic article. To that end, and without limitation, examples of such an additive include metal carbonates, metal sulfates, metal talcites, metal hydrotalcites, metal dihydrotalcites, fatty acids or salts thereof, fatty acid amides, silica gels, and fatty ester-, acid-, or amide-modified samples of such metal-based compounds, and any mixtures thereof. Preferred are metal carbonates, more preferred are stearate-modified metal carbonates, and most preferred is stearate-modified calcium carbonate. The presence of at least one dispersion aid additive (in an amount of from 1–80% by total weight of the concentrate, preferably from 2–75%, more preferably from 5–65%, and most preferably from 25–60%, basically in an amount that actually provides improved nucleation effects imparted by the bicyclic dicarboxylate salt nucleator within the target resin) appears to provide the desired properties of high peak crystallization temperature, increased stiffness, improved dimensional stability, etc., within the resultant thermoplastic (preferably, polypropylene) article. Such a result is highly unexpected, considering that such an aggregate of these properties is not exhibited by such individual additives. Particular dispersion aid additives that function in such a capacity are noted above (including metal carbonates, fatty ester-modified metal carbonates, and the like). Without intending on being bound to any specific scientific theory, it is believed that such dispersion aid additives provide effective prevention of agglomeration of the individual plate structures of the required bicyclic dicarboxylate salt nucleators. Such plate structures exhibit a propensity to accumulate and agglomerate, thus potentially deleteriously affecting the capability of such nucleators from fulfilling their desired function. Thus, as noted above, it is believed that the presence of such dispersion aid additives prevents such interaction during thermoplastic production after introduction of the inventive concentrates therein, thereby permitting the full benefits of such an effective nucleator to be realized.

Calcium carbonate itself is a commonly used filler in the polyolefins industry. It is typically used as a filler in manufactured articles in amounts ranging from 5–25% by total weight and typically provides improved modulus with minimal loss in impact strength (particularly when compared to a talc filler) along with significant cost savings as it is typically considered to be a less expensive raw material as compared to the polyolefin it is displacing. However, until now, the use of calcium carbonate within a concentrate for the purpose of optimizing nucleation performance (of HPN-68), and without being used as a highly loaded filler (i.e. 5–25%) in the final part being produced has not been known. While an effective filler, calcium carbonate itself is not regarded as an effective nucleator. For example, even at a 15% loading in a 20 MFR polypropylene impact copolymer, the filler may impart a polymer Tc of 117° C., ~8° C. higher than the same non-nucleated resin containing no calcium carbonate filler and ~10° C. lower than that which could be obtained with conventional loadings (~0.1%) of HPN-68. Thus, its presence within concentrates in combination with effective and efficient loadings of bicyclic dicarboxylate nucleating salts has not been taught nor suggested previously, particularly in terms of providing highly effective peak crystallization temperatures therein.

Previous attempts at providing concentrates were limited to the presence of the desired bicylic dicarboxylate nucleator salt alone within a polymer carrier. It is believed that in such previous concentrates [consisting of 2 primary components, a polyolefin carrier resin and the HPN-68 ($\geq 2\%$)], the performance of the bicyclic dicarboxylate nucleator suffered most likely from the agglomeration of the nucleator particles and subsequent poor dispersion of the nucleator particles after being let-down into the polyolefin intended for final use. The inventive concentrate formulation, consisting of at least 3 primary components, possibly more, apparently prevents the detrimental agglomeration of the bicyclic dicarboxylate particles within the concentrate and also serves to promote excellent dispersion of the nucleator particles after let-down as indicated by the optimum nucleation performance that can be obtained in the polyolefin intended for final use.

The term "concentrate" or "masterbatch" is well-understood by the ordinarily skilled artisan within the thermoplastic resin art as a manner of providing and delivering certain additives within target resins during manufacture. Thus, such a concentrate may be made by any commercial process steps, including dry-blending, melt-compounding, agglomeration, compaction, extrusion, and the like, and may be present in a typical solid or liquid form, including, without limitation, granular, flake, or pelletized solid form and liquid solution, suspension, or paste (whereby the inventive formulation has been diluted with a liquid carrier in order to modify its mode of delivery), and the like, in liquid (or liquid-like) form. In these latter examples, the thermoplastic carrier may actually be substituted by a liquid medium.

Depending on the primary components which are used in the inventive concentrate formulation, either opacity or improved transparency would be imparted to a polyolefin. While optimum nucleation would still be imparted in either case, consideration would need to be given to the optical property requirements associated with the manufactured article before a specific inventive concentrate formulation is selected.

As noted above, in order to develop a proper polyolefin nucleator compound or composition for industrial applications, a number of important criteria needed to be met. The desired saturated bicyclic dicarboxylate nucleating agents meet all of these important requirements very well. For instance, as discussed in greater detail below, these nucleating salts provide excellent high peak crystallization temperatures in a variety of polyolefin formulations, particularly within random copolymer polypropylene (hereinafter RCP), impact copolymer polypropylene (hereinafter ICP), homopolymer polypropylene (hereinafter HP), and polyethylene (such as low density polyethylene, linear low density polyethylene, high density polyethylene, and the like). As a result, such bicyclic dicarboxylate salts provide excellent mechanical properties for polyolefin articles without the need for extra fillers and rigidifying additives (although such fillers and additives may be included within target resins if desired), and desirable processing characteristics such as improved (shorter) cycle time. Such salts also do not interact deleteriously with calcium stearate additives.

As the polymer peak crystallization temperature (Tc) is known to be one of the best indicators of a nucleator's performance, a key quantitative method to assess the performance of a bicyclic dicarboxylate nucleator concentrate has been to determine the polymer Tc after let-down of the concentrate into a non-nucleated resin which was subsequently injection molded into test specimens. The polymer Tc determined here is then compared to the polymer Tc of a comparative sample that was prepared by incorporating the HPN-68 additive into the resin at-level via dry blending the neat nucleator powder into the polyolefin base reactor flake, melt compounding this mixture, then injection molding the same test specimens. This latter preparation of the comparative sample represents what can be achieved by polyolefin producers or toll compounders.

Concentrates containing relatively high loadings (3–10% by weight) of bicyclic dicarboxylate nucleators (such as HPN-68) have been found to produce polymer peak Tc results after let-down that are 2–4° C. lower than that which can be obtained by incorporating the HPN-68 via dry blending and melt compounding into the same base resin (a/k/a/, pre-compounded resins). In both cases the final concentration of HPN-68 for each scenario would be the same, for example, 1000 ppm.

On the other hand, similar polymer peak Tc values as compared with the pre-compounded resins have been achieved when the concentrate has contained a relatively low concentration of HPN-68 of approximately 1–1.5%. While this more dilute concentrate can deliver superior performance, it becomes economically prohibitive to use considering the loadings of the concentrate required in the non-nucleated resin to achieve the final desired concentration of HPN-68 (i.e. 1000 ppm).

It is a widely accepted practice in the polyolefins industry for a concentrate to be let-down at a 2% usage rate [otherwise known as a 50:1 let-down ratio (ldr)]. This let-down is accepted as one whereby the concentrate can be adequately dispersed and distributed into the base polymer without usually being economically prohibitive. Therefore, experiments were undertaken with concentrates having a bicyclic dicarboxylate nucleator concentration of 5%. With a 2% usage rate, or 50:1 ldr, a 5% concentrate would produce a bicyclic dicarboxylate nucleator concentration in the final part of 1000 ppm (0.1%) which falls within the optimum performance range for bicyclic dicarboxylate nucleator.

As noted above, the target polymers for introduction of such novel nucleating agents are thermoplastics, or more specifically, polyolefins. Such formulations may be utilized in myriad different end-uses, including without limitation, such broadly considered groups as fibers, thin film or thin-walled articles (e.g., pliable wrappers, thin-walled drinking cups, etc., having thicknesses between 0.1 and 15 mils, for example), thicker plaque or other like solid articles (e.g., from 15 to 150 mils in thickness), and even thicker-walled articles (e.g., greater than 150 mils thickness). Individual types of each group include, again, without limitation, either as complete articles, or as components of articles, the following:

a) fibers: spun and nonwoven polyolefin, polyamide, polyaramid, and the like, fibers of any denier measurement, as well as blends with other synthetic or natural fibers (e.g., cotton, ramie, wool, and the like); b) thin film articles: cast films, candy wrappers, package wrappers (e.g., cigarette box wrappers, for example), and other like blown, extruded, or other similar type of film application, as well as thin-walled articles, such as drinking cups, thin containers, coverings, and the like; c) thicker plaque or other like solid articles: deli containers, water cups, cooler linings, syringes, labware, medical equipment, pipes, tubes, urinalysis cups, intravenous bags, food storage containers, waste containers, cooler housings, automotive instrument panels, flower pots, planters, office storage articles, desk storage articles, bottles, disposable packaging (e.g., reheatable food containers, either thermoformed or thin-walled or high speed injection molded types), and the like; and d) even thicker-walled articles: i) automotive applications, such as door panels, instrument panels, body panels, fan covers, steering wheels, bumper fascia, fan shields, radiator shields, automotive fluid containers, battery cases, storage compartments, bottles, pipes, and the like; ii) large appliances, such as refrigerator linings, refrigerator parts (e.g., shelves, ice machine housings, door handles, and the like), dishwasher linings, dishwasher parts (e.g., racks, pipes, tubes, door handles, liquid and/or solid detergent storage compartments), washing machine drums, washing machine agitators, and the like; iii) small appliances, such as blender housings, blender containers, toaster oven housings, toaster oven handles, coffee pots, coffee pot housings, coffee pot handles, food processors, hair dryers, can openers, and the like; iv) housewares, such as large storage totes, large storage containers, lids for either such totes or containers, waste baskets, laundry baskets, shelves, coolers, clothes hangers, and the like; v) consumer products, such as furniture (e.g., small chairs, tables, and the like), toys, sporting goods, disposable packaging (e.g., reheatable food containers), compact disc cases, DVD cases, CD-ROM cases, floppy disc containers, floppy disc housings, VHS tape cases, VHS tape housings, flower pots, planters, clothes hangers, lawn accessories (e.g., lawn tools, and the like), garden accessories (e.g., garden implements), lawn mower housings, fuel containers, pipes, tubes, hoses, tool boxes, tackle boxes, luggage, conduits, lawn trimmer housings, large trash cans, infant car seats, infant chairs (e.g., for dining tables), and the like.

The term polyolefin or polyolefin resin is intended to encompass any materials comprised of at least one polyolefin compound. Preferred examples include isotactic and syndiotactic polypropylene, polyethylene, poly(4-methyl) pentene, polybutylene, and any blends or copolymers thereof, whether high or low density in composition, as well as polyolefin-containing elastomers (such as TPVs, TPEs, and the like). The polyolefin polymers of the present invention may include aliphatic polyolefins and copolymers made from at least one aliphatic olefin and one or more ethylenically unsaturated co-monomers. Generally, the co-monomers, if present, will be provided in a minor amount, e.g., about 10 percent or less or even about 5 percent or less, based upon the weight of the polyolefin (e.g. random copolymer polypropylene), but copolymers containing up to 25% or more of the co-monomer (e.g., impact copolymers) are also envisaged. Other polymers or rubber (such as EPDM or EPR) may also be compounded with the polyolefin to obtain the aforementioned characteristics. Such co-monomers may serve to assist in clarity improvement of the polyolefin, or they may function to improve other properties of the polymer (such as impact, etc.). Other examples include acrylic acid and vinyl acetate, and the like. Examples of olefin polymers whose transparency can be improved conveniently according to the present invention are polymers and copolymers of aliphatic monoolefins containing 2 to about 6 carbon atoms which have an average molecular weight of from about 10,000 to about 2,000,000, preferably from about 30,000 to about 300,000, such as, without limitation, polyethylene, linear low density polyethylene, isotactic polypropylene, syndiotactic polypropylene, crystalline ethylenepropylene copolymer, poly(1-butene), polymethylpentene, 1-hexene, 1-octene, and vinyl cyclohexane. The polyolefins of the present invention may be described as basically linear, regular polymers that may optionally contain side chains such as are found, for instance, in conventional low density polyethylene.

Although polyolefins are preferred, the nucleating agent concentrates of the present invention are not restricted to introduction within polyolefins, and may also give beneficial nucleation properties to polyesters such as polyethylene terephthalate (PET), polybutylene terephthalate (PBT), and polyethylene naphthalate (PEN), as well as polyamides such as Nylon 6, Nylon 6,6, and others. Generally, any thermoplastic composition having some crystalline content may be improved with the nucleating agent concentrates of the present invention. Thus, polymer foams (such as, as one non-limiting example, polypropylene foams) and wood-filled thermoplastics are also contemplated as target resins within this invention.

Furthermore, the polymer constituent of the concentrate is not required to be the same as the target thermoplastic to which the concentrate is added. In terms of actual chemical structure, in terms of physical properties (i.e., melt flow indices, etc.), in terms of molecular weight, and myriad other differences, the concentrate polymer may exhibit any such characteristics as compared with the polymer of the target to-be-nucleated thermoplastic without incident. Preferably, however, such concentrate polymer will at least be of the same chemical structure as the target thermoplastic (i.e., polypropylene concentrate added to a molten polypropylene resin), in order to provide more reliable physical results. Another potentially preferred example includes the utilization of impact copolymer (ICP), such as polypropylene ICP, as the concentrate polymer constituent for introduction within random copolymer (RCP), such as RCP polypropylene, ICP polypropylene, or polypropylene HP. Another potentially preferred example is the utilization of polyethylene as the concentrate polymer constituent for introduction within a polypropylene or impact copolymer polypropylene target resin.

The compositions of the present invention may be obtained by mixing and melt-extruding the aforementioned dispersion aid additive plus saturated bicyclic dicarboxylic salt (or combination of salts or composition comprising such salts) plus molten polymer constituent, allowing such a resultant formulation to cool, and slicing the resultant polymer into pellets. The desired thermoplastic polymer or copolymer can then be produced by introducing the concentrate therein (while the thermoplastic is in molten form or blending pellets of thermoplastic and concentrate first), and mixing and melt-extruding (or other polymer formation procedure) the resultant molten concentrate-containing thermoplastic, followed by cooling thereof.

The concentrate may contain other additives, such as antioxidants, lubricants, antistatic agents, ultraviolet absorbers, antimicrobial compounds and/or formulations, acid scavengers, polyolefin (e.g., polyethylene) waxes, stearate esters of glycerin, montan waxes, mineral oil, pigments, clarifying agents, other nucleators, and the like.

Air-jet milling of the bicyclic nucleator either by itself, or together with the dispersion aid additive, within the ultimate concentrate formulation has also been found to impart lower haze/increased peak crystallization temperature for target thermoplastic articles as well as to impart better physical properties thereto. There has been no discussion of any such air-jet milled bicyclic dicarboxylate nucleator within a masterbatch followed for the production of polymeric articles, let alone thermoplastics. Thus, one potentially preferred, though not required, embodiment of this invention is the presence of air-jet milled bicyclic dicarboxylate nucleators within the target concentrates.

The target thermoplastic composition may then be processed and fabricated by any number of different techniques, including, without limitation, injection molding, injection blow molding, injection stretch blow molding, rotational molding, compression molding, extrusion, extrusion blow molding, sheet extrusion, film extrusion, cast film extrusion, foam extrusion, thermoforming, film-forming (such as into blown-films, biaxially oriented films, and the like), thin wall injection molding, polymer foams (polypropylene foams, for example) and the like, into a fabricated article.

PREFERRED EMBODIMENTS OF THE INVENTION

This invention can be further elucidated through the following examples where examples of particularly preferred embodiment within the scope of the present invention are presented.

Production of Nucleating Salt

To a solution of disodium bicyclo[2.2.1]hept-5-ene-2,3-dicarboxylate (30.0 g) in water (70 g) was added 0.5 g palladium on activated carbon (5 wt %). The mixture was transferred into a Parr reactor and was subjected to hydrogenation (50 psi, room temperature) for 8 hours. The activated carbon was filtered out, and the resultant solution was spray dried to give a white powder (m.p. >300° C.). Spray drying was accomplished via a spray dryer using a rotary atomizer having an atomizer speed set at 9600 rpm with the inlet temperature set at 400° F. (~204–205° C.), and the outlet temperature kept between 220–225° F. (~104–108° C.). NMR and IR analyses were consistent with that of the expected structure of disodium bicyclo[2.2.1]heptane-2,3-dicarboxylate (hereinafter referred to as HPN-68).

Preparation of Non-Nucleated Resins

To test the performance of an experimental nucleator concentrate, the concentrate was let-down into a non-nucleated resin for subsequent blending of the mixture, injection molding of the mixture, and thermal analysis (polymer peak Tc) of the mixture. Unless otherwise indicated, a reactor grade flake was blended with a basic stabilization package on a low intensity Hobart A200 mixer using a flat beater attachment. The basic stabilization package consisted of a hindered phenol type primary antioxidant (0.05% of IRGANOX® 1010), a phosphite type secondary antioxidant (0.10% of IRGAFOS® 168), and a calcium stearate acid neutralizer (0.05% HYQUAL® 5853–90). The batch size was 3 kg and the low intensity blend time was 5 minutes with an agitator speed of 61 rpm and a beater speed of 107 rpm. The non-nucleated blends were then melt compounded on an MPM 38 mm single screw extruder having a length to diameter ratio of 24:1 and containing a Maddocks mixer. The zone temperatures of the extruder were ramped from 204° C. at the throat to 232° C. at the die. Screw speed was controlled at 130 rpm. The extrudate was filtered with a 60 mesh screen pack then passed through a 4 strand die, into a water bath, then into a pelletizer where the solidified strands were chopped into processible pellets.

Production of Concentrates with Preferred Nucleating Salt

Unless otherwise indicated, a reactor grade flake (or granule) was blended with a basic stabilization package, a high loading of nucleator as indicated in the following Experimental Tables 1–9, and also other various additives that were evaluated in various concentrations as enhancers to the performance of the subject nucleator when delivered from the concentrate (also referenced in the aforementioned Experimental Tables). The basic stabilization package, unless otherwise indicated, consisted of a hindered phenol type of primary antioxidant (0.05% Irganox 1010), a phosphite type secondary antioxidant (0.10% of Irgafos 168), and a calcium stearate acid neutralizer (0.05% HyQual 5853–90).

The batch size was 0.5 kg and this mixture was blended on a 4 liter Merlin high intensity mixer for 2 minutes @ 2100 rpm. The blended concentrate mixture was then melt compounded on a Prism corotating twin screw extruder having a screw diameter of 16 mm and a length to diameter ratio of 25:1. The extruder barrel temperature was controlled with the following setpoints: zone 1—195° C., zone 2—200° C., zone 3—205° C., zone 4—215° C., and die—200° C. Extruder screw rotation was controlled at 500 rpm and the feeder of the blended concentrate was set between 90–130 in order to control the torque of the extruder between 19.5–21.5 Newton meters.

Production of Nucleated Resins from Admixing the Non-Nucleated Resins and Concentrates The nucleator concentrates were let-down (i.e. 2% or 50:1) into the non-nucleated resin samples at the appropriate loading to deliver the final desired concentration (i.e. 0.1%) of nucleator (i.e. HPN-68). After the let-down had been made, the pelletized mixture was blended on a Kitchenaid Classic mixer using a metal whip mixing attachment. The samples were blended for 5 minutes with an agitator speed of 107 rpm and a mixing whip speed of 232 rpm.

After mixing, the samples were injection molded on an Arburg 40 ton press into test plaques having dimensions of 50.8 mm×76.2 mm×1.27 mm. The injection molder barrel temperature was controlled with a flat 230° C. profile while the mold temperature was controlled at 25° C. The molder contained a 25 mm general purpose screw having a length to diameter ratio of 25:1. A back pressure of ~250 bar was applied to the molten polymer during the screw recovery phase of the cycle. The total molding cycle was ~28 seconds.

Preparation of Nucleated Control Resins

Nucleated controls were prepared as a point of comparison for the concentrate after being let-down into a non-nucleated resin (previously described). Unless otherwise indicated in the previous tables, a reactor grade flake (or granule) was blended with a basic stabilization package and the comparative final target loading (i.e. 0.1%) of nucleator. The basic stabilization package, unless otherwise noted, consisted of a hindered phenol type primary antioxidant (0.05% Irganox 1010), a phosphite type secondary antioxidant (0.10% of Irgafos 168), and a calcium stearate acid neutralizer (0.05% HyQual 5853–90). The batch size was 1 kg and the mixtures were dry blended on a 4 liter Merlin high intensity mixer for 1 minute at 2100 rpm. These blends were subsequently melt compounded on a Killion 25 mm single screw extruder having a length to diameter ratio or 24:1 and containing a Maddocks mixer. Screw speed was 110 rpm. The extrudate was filtered through a 60 mesh screen pack and passed through a single strand die, into a water bath, and subsequently into a pelletizer where the solidified strand was chopped into processible pellets.

The compounded pellets were then injection molded on an Arburg 40 ton press into test plaques having dimensions of 50.8 mm×76.2 mm×1.27 mm. The injection molder barrel temperature was controlled with a flat 230° C. profile while the mold temperature was controlled at 25° C. The molder contained a 25 mm general purpose screw having a length to diameter ratio of 25:1. The total injection molding cycle was ~28 seconds.

Thermal Analysis of Produced Resins

The polymer peak crystallization temperature, Tc, was determined on the previously described injection molded test specimens. These thermal analyses were conducted on a Perkin Elmer DSC 7 using the following internal standard protocol. Samples were heated from 60° C. to 220° C. using a 20° C./min heating rate, then held for 2 minutes. All samples were then cooled from 220° C. to 60° C. using a 20° C./minute cooling rate. The crystallization exotherm for each sample was recorded and the peak crystallization temperature was determined for each sample. Sample size was ~5 mg.

Different Resins Utilized

The following table lists the different types of resins utilized within these embodiments. As these are merely for experimental purposes, and may be potentially preferred, it should be understood that such example resins are non-limiting, and thus any number of different resins may be utilized within this invention.

POLYOLEFIN RESIN TABLE

| # | Description | Grade |
|---|---|---|
| 1 | 12 MFR Polypropylene Homopolymer Reactor Flake | Basell PRO-FAX ® 6301 |
| 2 | 4 MFR Polypropylene Homopolymer Reactor Flake | Basell Pro-fax PH350 |
| 3 | 20 MFR Polypropylene Medium Impact Copolymer Reactor Flake | ExxonMobil 7684G E2 |
| 4 | 37 MFR Polypropylene Homopolymer Reactor Flake | Basell PH-020 |
| 5 | 0.5 MFR Polypropylene High Impact Copolymer Extruded Pellet | ExxonMobil PP7031E1 |
| 6 | 25 MFR Linear Low Density Polyethylene Extruded Pellet | Dow DOWLEX ® 2517 |

Experimental Section

For each example within Experimental Table 1, below, the concentrate carrier resin was a 20 MFR polypropylene medium impact copolymer to which the weight percent as noted within the table of the nucleator salt of the above example, was added when in molten form and thoroughly mixed therein. The resultant concentrate was then extruded and ultimately formed into pellets as noted above. The concentrate was then let-down into a 12 MFR polypropylene homopolymer when in molten form, mixed thoroughly, then cooled (in a molded form) to form a thermoplastic plaque.

Thermoplastic compositions (plaques) were produced comprising the initial concentrates noted above in the manner described previously. The sample thermoplastic was a 12 MFR homopolymer polypropylene (HP) for the following Experimental Tables unless otherwise noted.

Testing for nucleating effects and other important criteria were accomplished through the formation of plaques of nucleated polypropylene thermoplastic resin. These plaques were formed through the process outlined above with the specific compositions listed above with a let-down of the nucleator salt as noted in Experimental Table 1, below.

The resultant plaques were then tested for peak crystallization temperatures (by Differential Scanning Calorimetry). Crystallization is important in order to determine the time needed to form a solid article from the molten polyolefin composition. Generally, a polyolefin such as polypropylene has a crystallization temperature of about 105–110° C. at a cooling rate of 20° C./min. In order to reduce the amount of time needed to form the final product, as well as to provide the most effective nucleation for the polyolefin, the best nucleator compound added will invariably also provide the highest crystallization temperature for the final polyolefin product. The nucleation composition efficacy, particular polymer peak crystallization temperature ($T_c$), was evaluated by using a modified differential scanning procedure based upon the test protocol ASTM D3417–99 wherein the heating and cooling rates utilized have been altered to 20° C./minute each. Thus, to measure the peak crystallization temperatures of the samples, the specific polypropylene compositions were heated from 60° C. to 220° C. at a rate of 20° C. per minute to produce molten formulations and held at this temperature for 2 minutes. At that time, the temperature was then lowered at a rate of 20° C. per minute until it reached the starting temperature of 60° C. for each individual sample. The important crystallization temperatures were thus measured as the peak maxima during the individual crystallization exotherms for each sample.

The following Table lists the peak crystallization temperature results for the above-noted sample plaques prepared with the additives noted above [the pre-compounded nucleated control (Example 1, below) was made from the same 12 MFR polypropylene homopolymer that had been previously melt compounded with 1000 ppm of the nucleator salt (HPN-68) added when in molten form]:

EXPERIMENTAL TABLE 1

| # | Concentrate Composition % Carrier Resin | % HPN-68 | % Concentrate Usage In Let-Down | % HPN-68 In Test Specimen | Polymer Peak Tc (° C.) of Test Specimen |
|---|---|---|---|---|---|
| 1 | NA | NA | NA | 0.1 | 125.8 (control) |
| 2 | 99 | 1 | 10 | 0.1 | 126.6 |
| 3 | 98.5 | 1.5 | 6.7 | 0.1 | 125.6 |
| 4 | 98 | 2 | 5 | 0.1 | 124.8 |
| 5 | 97.5 | 2.5 | 4 | 0.1 | 124.8 |
| 6 | 97 | 3 | 3.3 | 0.1 | 123.7 |
| 7 | 95 | 5 | 2 | 0.1 | 123.5 |
| 8 | 92.5 | 7.5 | 1.34 | 0.1 | 123.8 |
| 9 | 90 | 10 | 1 | 0.1 | 123.0 |
| 10 | 85 | 15 | 0.67 | 0.1 | 122.4 |
| 11 | 80 | 20 | 0.5 | 0.1 | 122.0 |

Experimental Table 1 thus illustrates the challenge in obtaining optimum polymer Tc values with reasonable usage rates of the concentrate. Examples 2 and 3 (1 and 1.5% HPN-68 concentrates), for example, illustrate optimum nucleation performance, but the required usage rates in this scenario are not commercially viable. Beyond the 1.5% HPN-68 concentration, diminishing performance is observed. Therefore, it is seen that an HPN-68 concentrate having an HPN-68 concentration of 2% or greater suffers in performance in relation to a nucleated control. As the HPN-68 concentration moves higher, the performance penalty most likely results from inadequate dispersion of the site nucleator particles within the concentrate itself, combined with the corresponding decreasing usage level of the concentrate that inhibits adequate distributive mixing of the concentrate into the base polymer in which the let-down is made.

It was thus evident that the first type of concentrate encountered certain problems with peak crystallization temperatures. Although such a concentrate was helpful in terms of facilitating incorporation, transport, and storage, all at the manufacturing level, the lower peak crystallization temperatures (noted in Table 1, above) effectively decreased the capabilities of such a concentrate type below a critical threshold level, and thus would not be a valid replacement for pre-compounded nucleated resins including the same nucleator salts (the economic and performance costs involved with a lack of high peak crystallization temperatures would not merit substitution of the higher peak crystallization temperatures of the pre-compounded resins).

Thus, it was theorized that dispersion aids may prove helpful in permitting better dispersion of the nucleator salt within the target thermoplastic resin when let-down from within a concentrate form. Initially, dispersion aid additives of calcium carbonate modified with stearates (SUPER-COAT®, reported to be a surface-modified, beneficiated, wet ground marble containing ~1–2% of a stearic acid, from Imerys, and having a mean particle size of 1.1 microns prior to surface modification) was added to concentrates of 20 MFR impact copolymer propylene (as for the initial concentrates above) and the same nucleator salt from the Example above. The amount of the dispersion aid additive was modified for different concentrates but the amount of nucleator salt was kept static for each example. Plaques were then formed in the same manner as above as well, with the same peak crystallization temperature measurements taken for comparison purposes with the initial concentrate-nucleated thermoplastic examples of Experimental Table 1. It is noted that these plaque formulations are, of course, merely preferred embodiments of the inventive article and method and are not intended to limit the scope of this invention. The results for these dispersion aid additive-containing concentrates were as follows (with the same control nucleated resin present as in the first Experimental table, above):

EXPERIMENTAL TABLE 2

| # | Concentrate Composition % Carrier Resin | % HPN-68 | % CaCO₃ | % Concentrate Usage in Let-Down | % HPN-68 in Test Specimen | % CaCO₃ in Test Specimen | Polymer Peak Tc (° C.) of Test Specimen |
|---|---|---|---|---|---|---|---|
| 1 | NA | NA | NA | NA | 0.1 | 0 | 125.8 (control) |
| 2 | 95 | 5 | 0 | 2 | 0.1 | 0 | 123.5 |
| 3 | 94 | 5 | 1 | 2 | 0.1 | 0.02 | 123.1 |
| 4 | 82.5 | 5 | 12.5 | 2 | 0.1 | 0.25 | 123.5 |
| 5 | 70 | 5 | 25 | 2 | 0.1 | 0.50 | 123.9 |
| 6 | 57.5 | 5 | 37.5 | 2 | 0.1 | 0.75 | 124.6 |
| 7 | 45 | 5 | 50 | 2 | 0.1 | 1 | 125.5 |
| 8 | 25 | 5 | 70 | 2 | 0.1 | 1.4 | 125.6 |

Surprisingly, the CaCO₃ was found to have a positive influence on HPN-68's capacity to nucleate when formulated together and within a concentrate. Optimum benefits appeared to be achieved at a 50% loading of $CaCO_3$ in the concentrate, thereby producing a final loading of 1% $CaCO_3$ in the final part (test specimen) under these typical let-down conditions. No benefits in nucleation were realized until the $CaCO_3$ reached ~25% in the concentrate (or ~0.5% in the final test specimen; such as in Example 5 of Experimental Table 2).

Taking the optimized formulation containing 50% $CaCO_3$ and 5% HPN-68, further evaluations were performed at differing concentrate usage rates and subsequently differing final concentrations of HPN-68 to insure robust performance of the inventive compound. In all cases, the performance of the concentrate was compared to an HPN-68 nucleated control that had been previously melt compounded with the final target concentrations of HPN-68. In the following examples in Experimental Table 3, the concentrate carrier resin was a 12 MFR polypropylene homopolymer. The concentrate was let-down into a non-nucleated, previously compounded 12 MFR polypropylene homopolymer. The nucleated controls (Examples 1, 3, 5, and 7) were made from the same 12 MFR polypropylene homopolymer that had been previously compounded with the final target concentrations of HPN-8 (as above in the previous Experimental Tables).

EXPERIMENTAL TABLE 3

| # | Concentrate Composition % Carrier Resin | % HPN-68 | % $CaCO_3$ | % Concentrate Usage in Let-Down | % HPN-68 in Test Specimen | % $CaCO_3$ in Test Specimen | Polymer Peak Tc (° C.) of Test Specimen |
|---|---|---|---|---|---|---|---|
| 1 | NA | NA | NA | NA | 0.05 | 0 | 124.3 (control) |
| 2 | 45 | 5 | 50 | 1 | 0.05 | 0.5 | 124.7 |
| 3 | NA | NA | NA | NA | 0.072 | 0 | 125.0 (control) |
| 4 | 45 | 5 | 50 | 1.44 | 0.072 | 0.72 | 126.7 |
| 5 | NA | NA | NA | NA | 0.10 | 0 | 125.8 (control) |
| 6 | 45 | 5 | 50 | 2.0 | 0.10 | 1.0 | 126.2 |
| 7 | NA | NA | NA | NA | 0.15 | 0 | 126.0 (control) |
| 8 | 45 | 5 | 50 | 3.0 | 0.15 | 1.5 | 126.3 |

The inventive compound showed robust performance and even demonstrated superior nucleation performance in these evaluations as compared to the nucleated controls.

Next, further concentrate evaluations involving 50% $CaCO_3$ were performed to determine if this particular $CaCO_3$ loading had beneficial effects regardless of the concentration of the HPN-68 present in the concentrate. Comparisons were made to selected samples presented in Experimental Table 1, above. The concentrates presented below in Experimental Table 4 were prepared in the same manner as for the Examples above. Comparisons were initiated with 2% HPN-68 in the concentrate as lesser concentrations (1 and 1.5%) already demonstrated optimum performance and would not need nor benefit from the unexpected effects of $CaCO_3$ like the concentrates containing HPN-68 concentrations of 2% and above—all of which suffered from sub-optimum performance after let-down. The results were as follows:

EXPERIMENTAL TABLE 4

| # | Concentrate Composition % Carrier Resin | % HPN-68 | % $CaCO_3$ | % Concentrate Usage in Let-Down | % HPN-68 in Test Specimen | % $CaCO_3$ in Test Specimen | Polymer Peak Tc (° C.) of Test Specimen |
|---|---|---|---|---|---|---|---|
| 1 | 98 | 2 | 0 | 5 | 0.1 | 0 | 124.8 |
| 2 | 48 | 2 | 50 | 5 | 0.1 | 2.5 | 125.6 |
| 3 | 97 | 3 | 0 | 3.3 | 0.1 | 0 | 123.7 |
| 4 | 47 | 3 | 50 | 3.3 | 0.1 | 1.65 | 125.5 |
| 5 | 95 | 5 | 0 | 2 | 0.1 | 0 | 123.5 |
| 6 | 45 | 5 | 50 | 2 | 0.1 | 1.0 | 125.5 |
| 7 | 92.5 | 7.5 | 0 | 1.34 | 0.1 | 0 | 123.8 |
| 8 | 42.5 | 7.5 | 50 | 1.34 | 0.1 | 0.67 | 124.3 |
| 9 | 90 | 10 | 0 | 1 | 0.1 | 0 | 123.0 |
| 10 | 40 | 10 | 50 | 1 | 0.1 | 0.5 | 123.9 |
| 11 | 85 | 15 | 0 | 0.67 | 0.1 | 0 | 122.4 |
| 12 | 35 | 15 | 50 | 0.67 | 0.1 | 0.34 | 124.2 |
| 13 | 80 | 20 | 0 | 0.5 | 0.1 | 0 | 122.0 |
| 14 | 30 | 20 | 50 | 0.5 | 0.1 | 0.25 | 123.9 |

While all of the HPN-68 concentrates benefited with the addition of 50% $CaCO_3$ within the concentrate, it appears that the optimum formulation for the inventive compound is in the situation of Example 6. There, a polymer Tc was achieved that was very close to what can be attained by a pre-compounded nucleated control (reference Experimental Table 1, Example 1, for instance), while still enjoying a preferred concentrate usage of 2%.

In the previous tables, the inventive concentrate has been shown to work well in a couple of different carrier resin/let-down resins combinations. Keeping the formulation of the concentrate constant (carrier resin: 45%, HPN-68:5%, and $CaCO_3$: 50%) additional carrier resin/let-down resin combinations were evaluated to insure the robustness of the concentrate in a variety of potential field conditions. In all situations following in Experimental Table 5, the concentrate usage was held constant at 2% to produce a final HPN-68 concentration of 0.1% in the test specimen.

Robust performance of the inventive concentrate formulation was thus observed in a wide range of polymer combinations relating to the carrier resin and let-down resin, even when large disparities in melt viscosities (molecular weight) existed between them.

Having proven that the inventive concentrate formulation worked well in a variety of types of carrier resin/let-down resin combinations, the next area of evaluation involved determining the robustness of the formulation when colored pigments were incorporated into the concentrate. Examples follow in Experimental Table 6 wherein a red pigment (MICROLEN® DPP Rubine TR-MC) and a blue pigment (IRGALITE® Blue GBP)(both from Ciba Chemicals) were evaluated. As before, the concentrate carrier resin was a 20 MFR polypropylene impact copolymer. The concentrates were let-down into a 12 MFR non-nucleated polypropylene homopolymer.

EXPERIMENTAL TABLE 5

| # | Concentrate Carrier Resin | Let-Down Resin | Polymer Tc (° C.) of Test Specimen after Let-Down | Nucleated Control (0.1% HPN-68) of Same Let-Down Resin |
|---|---|---|---|---|
| 1 | 20 MFR Polypropylene Medium Impact Copolymer | 12 MFR Polypropylene Homopolymer | 125.5 | 125.8 |
| 2 | 12 MFR Polypropylene Homopolymer | 12 MFR Polypropylene Homopolymer | 126.2 | 125.8 |
| 3 | 12 MFR Polypropylene Homopolymer | 4 MFR Polypropylene Homopolymer | 125.4 | 125.8 |
| 4 | 20 MFR Polypropylene Medium Impact Copolymer | 20 MFR Polypropylene Medium Impact Copolymer | 126.3 | 126.4 |
| 5 | 37 MFR Polypropylene Homopolymer | 20 MFR Polypropylene Medium Impact Copolymer | 127.0 | 126.4 |
| 6 | 4 MFR Polypropylene Homopolymer | 20 MFR Polypropylene Medium Impact Copolymer | 126.6 | 126.4 |
| 7 | 4 MFR Polypropylene Homopolymer | 37 MFR Polypropylene Homopolymer | 125.1 | 125.4 |
| 8 | 12 MFR Polypropylene Homopolymer | 37 MFR Polypropylene Homopolymer | 125.4 | 125.4 |
| 9 | 20 MFR Polypropylene Medium Impact Copolymer | 37 MFR Polypropylene Homopolymer | 125.0 | 125.4 |
| 10 | 25 MFR Polyethylene* Linear Low Density | 12 MFR Polypropylene Homopolymer | 125.4 | 125.8 |
| 11 | 25 MFR Polyethylene* Linear Low Density | 25 MFR Polyethylene* Linear Low Density | 108.0 | 107.6 |
| 12 | 20 MFR Polypropylene Medium Impact Copolymer | 0.5 MFR Polypropylene* High Impact Copolymer | 125.1 | 124.7 |

*Only available commercially in pellet form. Other resins found in Experimental Table 5 were available in reactor flake form.

EXPERIMENTAL TABLE 6

| | Concentrate Composition | | | | | % Concentrate Usage in Let-Down | % HPN-68 in Test Specimen | % $CaCO_3$ in Test Specimen | % Pigment in Test Specimen | Polymer Peak Tc (° C.) of Test Specimen |
|---|---|---|---|---|---|---|---|---|---|---|
| # | % Carrier Resin | % HPN-68 | % $CaCO_3$ | % Red Pigment | % Blue Pigment | | | | | |
| 1 | 90 | 5 | 0 | 5 | 0 | 2 | 0.1 | 0 | 0.1 | 124.6 |
| 2 | 40 | 5 | 50 | 5 | 0 | 2 | 0.1 | 1 | 0.1 | 125.8 |
| 3 | 93.5 | 5 | 0 | 0 | 1.5 | 2 | 0.1 | 0 | 0.03 | 124.2 |
| 4 | 43.5 | 5 | 50 | 0 | 1.5 | 2 | 0.1 | 1 | 0.03 | 125.6 |

In the case of pigmented concentrates as seen in Experimental Table 6, the calcium carbonate also boosted the performance of HPN-68. Since it has been found previously that pigments may impart deleterious and/or adverse effects within polyolefins, including warpage and shrinkage, this unexpected finding aids in providing a nucleator (in concentrate form) that can combat such problematic issues with pigmented resins and provide superior polymer Tc.

Evaluations continued in order to determine whether or not the presence of dispersion aid additives would offer any benefits in nucleation (polymer peak Tc) if incorporated within concentrates including other commercially available thermoplastic nucleators [aluminum para-tertiary butyl benzoic acid (Al-p-TBBA), and sodium 2,2'-methylene bis (4,6-di-t-butylphenyl) phosphate (NA-11, from Asahi Denka)]. Additionally, commercially available talc SUZORITE® BT-2207 (reported to have a median particle size of 7 microns, from Zemex) was also evaluated as a substitution for $CaCO_3$ to determine if any synergistic effects could be identified with this commonly used polyolefin filler as well. As before, the concentrate carrier resin was a 20 MFR polypropylene impact copolymer. The concentrates were let-down into a 12 MFR non-nucleated polypropylene homopolymer. The nucleated controls (Examples 1, 5, and 9) were made from the same 12 MFR polypropylene homopolymer that had been previously melt compounded with 1000 ppm of the subject nucleator. All co-additive stabilization packages remained the same for the Al-p-TBBA and NA-11 concentrates and nucleated controls except that the acid neutralizer, calcium stearate at 0.05%, was replaced with the preferred acid neutralizer synthetic hydrotalcite (DHT-4A@ 0.04%). The comparative nucleator and filler evaluations were as follows.

The inventive $CaCO_3$ concentrate formulation did not appear to offer any nucleation benefits to Al-p-TBBA or NA-11. The effects of $CaCO_3$ actually appeared to be slightly harmful in these situations. Talc, appeared to offer neutral results with Al-p-TBBA and deleterious results with NA-11 and HPN-68. Thus, the inclusion of the above-noted preferred calcium carbonate dispersion aid additives within concentrates with the preferred class of bicyclic dicarboxylate salt nucleators provided surprisingly effective results as compared with concentrates of other nucleating agents.

With the previous experiments in Experimental Table 7 showing differing effects of $CaCO_3$ and talc on other nucleating systems, the next evaluations focused on understanding the mechanism enabling $CaCO_3$ to boost the nucleation performance of HPN-68 when incorporated from the inventive concentrate formulation.

As discussed previously the $CaCO_3$ used thus far in these evaluations was Imerys SUPERCOAT®, a stearic acid surface-modified $CaCO_3$. To sort out the effects that the $CaCO_3$ and stearic acid may be imparting, a series of experiments was performed with a similar particle size $CaCO_3$ containing no stearic acid coating. The brand of $CaCO_3$ used here was Sigma-Aldrich 310034, having an average particle size of 8.75 microns with no presence of stearic acid. Additionally, a comparative concentrate formulation was prepared containing 1% stearic acid with no $CaCO_3$ The stearic acid brand used here was Sigma-Aldrich 17,536–6. As before, the concentrate carrier resin was a 20 MFR polypropylene impact copolymer. The concentrates were let-down into a 12 MFR polypropylene homopolymer. As seen in previous tables, a nucleated control made from the same 12 MFR

EXPERIMENTAL TABLE 7

| # | Concentrate Composition % Carrier Resin | % Nucleator | % CaCO3 | % Talc | % Concentrate Usage in Let-Down | % Nucleator in Test Specimen | % CaCO3 in Test Specimen | % Talc in Test Specimen | Polymer Peak Tc (° C.) of Test Specimen |
|---|---|---|---|---|---|---|---|---|---|
| 1 | NA | NA | NA | NA | NA | 0.1 (Al-p-TBBA) | 0 | 0 | 122.8 (control) |
| 2 | 95 | 5 (Al-p-TBBA) | 0 | 0 | 2 | 0.1 (Al-p-TBBA) | 0 | 0 | 123.4 |
| 3 | 45 | 5 (Al-p-TBBA) | 50 | 0 | 2 | 0.1 (Al-P-TBBA) | 1 | 0 | 122.6 |
| 4 | 45 | 5 (Al-p-TBBA) | 0 | 50 | 2 | 0.1 (Al-p-TBBA) | 0 | 1 | 123.1 |
| 5 | NA | NA | NA | NA | NA | 0.1 (NA-11) | 0 | 0 | 125.1 (control) |
| 6 | 95 | 5 (NA-11) | 0 | 0 | 2 | 0.1 (NA-11) | 0 | 0 | 123.9 |
| 7 | 45 | 5 (NA-11) | 50 | 0 | 2 | 0.1 (NA-11) | 1 | 0 | 122.8 |
| 8 | 45 | 5 (NA-11) | 0 | 50 | 2 | 0.1 (NA-11) | 0 | 1 | 121.9 |
| 9 | NA | NA | NA | NA | NA | 0.1 (HPN-68) | 0 | 0 | 125.8 (control) |
| 10 | 95 | 5 (HPN-68) | 0 | 0 | 2 | 0.1 (HPN-68) | 0 | 0 | 123.5 |
| 11 | 45 | 5 (HPN-68) | 50 | 0 | 2 | 0.1 (HPN-68) | 1 | 0 | 125.5 |
| 12 | 45 | 5 (HPN-68) | 0 | 50 | 2 | 0.1 (HPN-68) | 0 | 1 | 121.2 | polypropylene homopolymer that had been previously melt compounded with 0.1% HPN-68 was provided for comparison.

EXPERIMENTAL TABLE 8

| # | Concentrate Composition | | | | | | Polymer Peak Tc | |
|---|---|---|---|---|---|---|---|---|
| | % Carrier Resin | % HPN-68 | % S-A Stearic Acid 17,536-6 | % S-A CaCO$_3$ 310034 | % IMERYS CaCO$_3$ Supercoat** | % Concentrate Usage in Let-Down | % HPN-68 In Test Specimen | (° C.) of Test Specimen |
| 1 | NA | NA | NA | NA | NA | NA | 0.1 | 125.8 (Control) |
| 2 | 95 | 5 | 0 | 0 | 0 | 2 | 0.1 | 123.5 |
| 3 | 94 | 5 | 1 | 0 | 0 | 2 | 0.1 | 124.8 |
| 4 | 45 | 5 | 0 | 50 | 0 | 2 | 0.1 | 125.0 |
| 5 | 45 | 5 | 0 | 0 | 50 | 2 | 0.1 | 125.5 |

**Reported to contain ~1–2% stearic acid

The results in Experimental Table 8 indicate that both stearic acid and calcium carbonate have independently positive effects on the nucleation performance of HPN-68 when incorporated into the concentrate. However, the combination of stearic acid and calcium carbonate, such as the case with Imerys Supercoat, apparently even has a greater synergistic effect. While only ground versions of calcium carbonate were evaluated here, it would certainly be expected that precipitated versions of calcium carbonate would work just as well or better as these versions are known to have similar or even sub-micron particle sizes.

Other potential dispersion aid additives were evaluated to determine if similar enhancements to HPN-68's nucleation performance could be realized when incorporated into the concentrate. A 12 MFR polypropylene homopolymer carrier resin was used in the following Examples 3 and 4; in all other Examples the concentrate carrier resin was a 20 MFR polypropylene impact copolymer. All concentrates were let-down into a 12 MFR non-nucleated polypropylene homopolymer. And again, as in earlier tables, a nucleated control (Example 1) made from the same 12 MFR polypropylene homopolymer that had been previously melt compounded with 0.1% HPN-68 was provided for comparison.

Of the various assortment of other chemistries evaluated, those offering a boost to the nucleation performance of HPN-68 when incorporated into a concentrate were the Sylobloc M250 and the blend of calcium stearate and synthetic hydrotalcite. These results were unexpected as extensive formulation studies have shown that HPN-68 works well in the presence of calcium stearate; however, nucleation performance has suffered when HPN-68 has been used in the presence of synthetic hydrotalcite alone in conventional nucleated polypropylene resins. The synergistic effect of calcium stearate with hydrotalcite in the presence of HPN-68 is thus unexpected.

Having described the invention in detail it is obvious that one skilled in the art will be able to make variations and modifications thereto without departing from the scope of the present invention. Accordingly, the scope of the present invention should be determined only by the claims appended hereto.

That which is claimed is:

1. A thermoplastic additive concentrate comprising at least one polymer constituent, at least one saturated bicyclic dicarboxylate salt nucleating agent, and at least one dispersion aid additive, said dispersion aid additive comprising a metal carbonate; wherein said nucleating agent is present within said concentrate in an amount of from about 2 to about 20% by total weight thereof.

EXPERIMENTAL TABLE 9

| # | Concentrate Composition | | | | | | | | % Concentrate Usage in Let-Down | % HPN-68 in Test Specimen | Polymer Peak Tc (° C.) of Test Specimen |
|---|---|---|---|---|---|---|---|---|---|---|---|
| | % Carrier Resin | % HPN-68 | Sylobloc M250[a] | HyQual 5853-90[b] | DHT-4A[c] | Epsom Salt[d] | Micronite 15150[e] | Cratec 405D-17C[f] | | | |
| 1 | NA | NA | NA | NA | NA | NA | NA | NA | NA | 0.1 | 125.8 (control) |
| 2 | 95 | 5 | 0 | 0 | 0 | 0 | 0 | 0 | 2 | 0.1 | 123.5 |
| 3 | 80 | 5 | 15 | 0 | 0 | 0 | 0 | 0 | 2 | 0.1 | 125.0 |
| 4 | 87 | 5 | 0 | 2 | 6 | 0 | 0 | 0 | 2 | 0.1 | 125.8 |
| 5 | 45 | 5 | 0 | 0 | 0 | 50 | 0 | 0 | 2 | 0.1 | 124.2 |
| 6 | 45 | 5 | 0 | 0 | 0 | 0 | 50 | 0 | 2 | 0.1 | 122.8 |
| 7 | 75 | 5 | 0 | 0 | 0 | 0 | 0 | 20 | 2 | 0.1 | 123.0 |

[a]SYLOBLOC ® M250 - Grace Davison, 50/50 blend of silica gel and erucamide
[b]HyQual 5853-90 - Mallinckrodt calcium stearate
[c]DHT-4A - Kyowa, synthetic hydrotalcite
[d]Epsom Salt - Sigma-Aldrich 23039-1, magnesium sulfate heptahydrate
[e]MICRONITE ® 15150 - Fibertec, calcium metasilacate (mica), median particle size = 55 microns
[f]CRATEC ® 405D-17C - Owens Corning, 4 mm chopped glass fiber strands 2. The concentrate of claim 1 wherein said saturated bicylic dicarboxylate salt conforms to the structure of Formula (II)

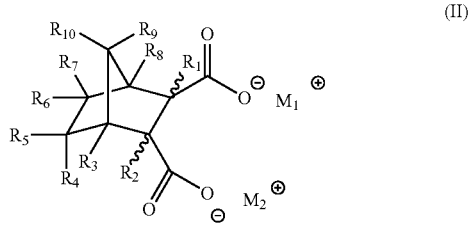

(II)

wherein $M_1$ and $M_2$ are the same or different and are independently selected from the group consisting of metal cations or the two metal ions are unified into a single metal ion and $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, $C_1$–$C_9$ alkylamine, halogen, phenyl, alkylphenyl, and geminal or vicinal carbocyclic having up to 9 carbon atoms.

3. The concentrate of claim 2 wherein said metal cation is selected from the group consisting of: sodium, potassium, calcium, lithium, rubidium, barium, magnesium, strontium, silver, zinc, and aluminum.

4. The concentrate of claim 3 wherein said metal cation is sodium.

5. The concentrate of claim 1 wherein said metal carbonate comprises a calcium carbonate-containing compound.

6. The concentrate of claim 1 wherein said polymer constituent comprises a polyolefin.

7. The concentrate of claim 6 wherein said polyolefin is polypropylene.

8. The concentrate of claim 7 wherein said polypropylene provides a Melt Flow Index (MFI) of from about 0.5 to about 37.

9. The concentrate of claim 1 wherein said metal carbonate comprises a stearate modified metal carbonate.

10. The concentrate of claim 1 wherein said metal carbonate comprises a stearate modified calcium carbonate.

11. The concentrate of claim 1 wherein said dispersion aid additive is provided in an amount of from about 1 to about 80% by total weight of said concentrate.

12. The concentrate of claim 1 wherein said dispersion aid additive is provided in an amount of from about 5 to about 65% by total weight of said concentrate.

13. The concentrate of claim 12 wherein said metal carbonate comprises a stearate modified metal carbonate.

14. The concentrate of claim 13 wherein said metal comprises calcium.

15. The concentrate of claim 1 wherein said polymer constituent comprises polyethylene.

16. The concentrate of claim 15 wherein said polyethylene provides a Melt Flow Index (MEI) of about 25.

17. A polymeric article of manufacture made by adding the concentrate of claim 1 to a polymer.

18. The additive concentrate of claim 1 wherein said dispersion aid additive comprises calcium carbonate, and wherein said concentrate further comprises a second dispersion aid additive of a stearic acid or derivative thereof.

19. The additive concentrate of claim 1 wherein said dispersion aid additive comprises calcium stearate, and wherein said concentrate further comprises a second dispersion aid additive of hydrotalcite.

20. The concentrate of claim 2 wherein said polymer constituent comprises a polyolefin.

21. The concentrate of claim 5 wherein said polymer constituent comprises a polyolefin.

22. A polymeric article of manufacture made by adding the concentrate of claim 3 to a polymer.

23. A polymeric article of manufacture made by adding the concentrate of claim 5 to a polymer.

24. The article of claim 23 wherein the calcium carbonate in said article is provided in a concentration of from about 0.5 to about 1.4% by weight of the article.

25. A masterbatch thermoplastic additive concentrate comprising:
  (a) at least one polymer constituent,
  (b) at least one saturated bicyclic dicarboxylate salt nucleating agent, and
  (c) at least one dispersion aid additive, said dispersion aid additive comprising one or more selected from the following:
    i) a metal carbonate,
    ii) blends of silica gel and erucamide,
    iii) a blend of metal talcites, metal hydrotalcites, or metal dihydrotalcites, and a fatty acid salt; and
    iv) stearate modified metal carbonates.

26. The masterbatch concentrate of claim 25, wherein said dispersion aid additive comprises a stearate modified calcium carbonate.

27. The masterbatch concentrate of claim 25, wherein said polymeric constituent comprises polypropylene.

28. The masterbatch concentrate of claim 27, wherein said polypropylene provides an MFI value of from about 1 to about 37.

29. The masterbatch concentrate of claim 25 wherein said dispersion aid additive is provided in an amount of from about 1 to about 80% by total weight of said concentrate.

30. The masterbatch concentrate of claim 25 wherein said dispersion aid additive is provided in an amount of from about 5 to about 65% by total weight of said concentrate.

31. A polymeric article of manufacture comprising the concentrate of claim 25.

32. The concentrate of claim 25, wherein said nucleating agent is present within said concentrate in an amount of from about 2 to about 20% by total weight thereof.

33. A thermoplastic masterbatch concentrate comprising:
  (a) at least one polypropylene,
  (b) at least one bicyclic dicarboxylate salt nucleating agent, and
  (c) at least one dispersion aid additive, said dispersion aid additive comprising one or more of the following:
    i) a metal carbonate,
    ii) a metal sulfate,
    iii) a metal talcite, metal hydrotalcite, or metal dihydrotalcite compound with a fatty acid salt;
    iv) a stearate modified calcium carbonate;
  wherein the concentration of said dispersion aid additive is present in an amount of from about 5% to about 65% of the masterbatch concentrate.

34. A polymeric article comprising the thermoplastic masterbatch concentrate of claim 33.

35. The thermoplastic masterbatch concentrate of claim 33 wherein said bicyclic dicarboxylate salt comprises disodium bicyclo [2.2.1] heptane-2,3-dicarboxylate.

36. The thermoplastic masterbatch concentrate of claim 33 wherein said dispersion aid comprises stearate modified calcium carbonate.

37. The thermoplastic masterbatch concentrate of claim 33 wherein said dispersion aid comprises calcium stearate combined with at least one species of hydrotalcite compound.

38. A thermoplastic additive concentrate comprising:
(a) at least one polymer constituent,
(b) at least one saturated nucleating agent as set forth below in Formula (I)

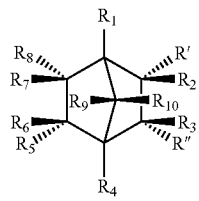

(i) wherein $R_1$, $R_2$, $R_3$, $R_4$, $R_5$, $R_6$, $R_7$, $R_8$, $R_9$, and $R_{10}$ are individually selected from the group consisting of hydrogen, $C_1$–$C_9$ alkyl, hydroxy, $C_1$–$C_9$ alkoxy, $C_1$–$C_9$ alkyleneoxy, amine, $C_1$–$C_9$ alkylamine, halogen, phenyl, alkylphenyl, and geminal or vicinal carbocyclic having up to nine carbon atoms,
(ii) R' and R" are the same or different and are individually selected from the group consisting of hydrogen, $C_1$–$C_{30}$ alkyl, hydroxy, amine, polyamine, polyoxyamine, $C_1$–$C_{30}$ alkylamine, phenyl, halogen, $C_1$–$C_{30}$ alkoxy, $C_1$–$C_{30}$ polyoxyalkyl, C(O)—$NR_{11}$C(O)O—R''', and C(O)O—R''',
wherein $R_{11}$, if present, is selected from the group consisting of: $C_1$–$C_{30}$ alkyl, hydrogen, $C_1$–$C_{30}$ alkoxy, and $C_1$–$C_{30}$ polyoxyalkyl, and
wherein R''', if present, is selected from the group consisting of hydrogen, a metal ion, an organic cation, polyoxy-$C_2$–$C_{18}$-alkylene, $C_1$–$C_{30}$ alkyl, $C_1$–$C_{30}$ alkylene, $C_1$–$C_{30}$ alkyleneoxy, a steroid moiety, phenyl, polyphenyl, $C_1$–$C_{30}$ alkylhalide, and $C_1$–$C_{30}$ alkylamine;
(iii) wherein at least one of R' and R" is either C(O)—$NR_{11}$C(O)O—R''' or C(O)O—R''',
(iv) wherein if both R' and R" are C(O)O—R''' then each of said R''' groups may optionally be combined into a single bivalent metal ion or a single trivalent metal overbase; and
(c) and at least one dispersion aid additive, said dispersion aid additive comprising one or more selected from the following:
(i) a metal carbonate,
(ii) a metal sulfate,
(iii) a blend of metal talcites, metal hydrotalcites, or metal dihydrotalcites, and a fatty acid salt; or
(iv) metal carbonate modified with stearates;
(v) a blend of silica gel and erucamide; and
wherein said saturated nucleating agent is present within said concentrate in an amount of from about 2 to about 20% by total weight of concentrate.

39. The additive concentrate of claim 38 wherein said polymer constituent comprises a polyolefin.

40. The additive concentrate of claim 39 wherein said polyolefin is polypropylene impact copolymer.

41. The concentrate of claim 38 wherein said metal carbonate comprises a stearate modified metal carbonate.

42. The concentrate of claim 38 wherein said metal carbonate comprises a stearate modified calcium carbonate.

43. The concentrate of claim 38 wherein said dispersion aid additive is provided in an amount of from about 1 to about 80% by total weight of said concentrate.

44. The concentrate of claim 38 wherein said dispersion aid additive is provided in an amount of from about 5 to about 65% by total weight of said concentrate, and further wherein said dispersion aid additive comprises a stearate modified calcium carbonate.

* * * * *

UNITED STATES PATENT AND TRADEMARK OFFICE
CERTIFICATE OF CORRECTION

PATENT NO. : 7,078,450 B2  Page 1 of 1
APPLICATION NO. : 10/703855
DATED : July 18, 2006
INVENTOR(S) : Lake et al.

It is certified that error appears in the above-identified patent and that said Letters Patent is hereby corrected as shown below:

Column 25, line 58, claim 16 "MEI" should read --MFI--

Signed and Sealed this

Third Day of October, 2006

JON W. DUDAS
*Director of the United States Patent and Trademark Office*